United States Patent
Han et al.

(10) Patent No.: US 7,388,998 B2
(45) Date of Patent: Jun. 17, 2008

(54) APPARATUS AND METHOD FOR CONTROLLING BRIGHTNESS OF MOVING IMAGE SIGNALS IN REAL TIME

(75) Inventors: Dong-Il Han, Seoul (KR); Han Jung, Seoul (KR); Chul-Ho Lim, Seoul (KR)

(73) Assignee: Ed-Tech Co., Ltd., Seoul (KR)

( * ) Notice: Subject to any disclaimer, the term of this patent is extended or adjusted under 35 U.S.C. 154(b) by 918 days.

(21) Appl. No.: 10/875,777

(22) Filed: Jun. 23, 2004

(65) Prior Publication Data
US 2005/0002565 A1    Jan. 6, 2005

(30) Foreign Application Priority Data
Jul. 4, 2003    (KR) .................... 10-2003-0045188

(51) Int. Cl.
G06K 9/40    (2006.01)
(52) U.S. Cl. .................... 382/274; 382/167; 382/168; 345/589; 345/690; 348/251; 348/254; 358/461; 358/518
(58) Field of Classification Search .................. 382/274
See application file for complete search history.

(56) References Cited

U.S. PATENT DOCUMENTS

| | | | | |
|---|---|---|---|---|
| 4,950,894 A | * | 8/1990 | Hara et al. .................. | 250/587 |
| 5,124,913 A | * | 6/1992 | Sezan et al. ................. | 382/132 |
| 5,388,168 A | * | 2/1995 | Sakashita et al. ............ | 382/169 |
| 5,857,030 A | * | 1/1999 | Gaborski et al. ............. | 382/132 |
| 5,857,033 A | * | 1/1999 | Kim .......................... | 382/168 |
| 5,862,254 A | * | 1/1999 | Kim et al. ................... | 382/168 |
| 5,923,383 A | * | 7/1999 | Kim .......................... | 348/672 |
| 5,937,090 A | * | 8/1999 | Kim .......................... | 382/167 |
| 5,949,918 A | * | 9/1999 | McCaffrey ................... | 382/274 |
| 5,963,665 A | * | 10/1999 | Kim et al. ................... | 382/169 |
| 5,995,656 A | * | 11/1999 | Kim .......................... | 382/169 |
| 6,018,588 A | * | 1/2000 | Kim .......................... | 382/167 |
| 6,049,626 A | * | 4/2000 | Kim .......................... | 382/167 |
| 6,075,890 A | * | 6/2000 | Park ......................... | 382/169 |
| 6,078,686 A | * | 6/2000 | Kim .......................... | 382/167 |

(Continued)

FOREIGN PATENT DOCUMENTS

EP        860795  A1 *  8/1998

(Continued)

Primary Examiner—Matthew C. Bella
Assistant Examiner—Sath V. Perungavoor
(74) Attorney, Agent, or Firm—Cooper & Dunham LLP (57) ABSTRACT

The present invention relates to an image processing apparatus, which calculates the histogram of an image on the basis of moving image information that is input in real time, and corrects and outputs the brightness of the image using the histogram in real time. The apparatus for controlling the brightness of moving image signals according to the present invention includes a cumulative difference function detection means, an image storage means and a brightness adjustment means. The cumulative difference function detection means calculates a cumulative difference function using upper n bits of each input image. The image storage means stores therein the input image. The brightness adjustment means adjusts the brightness of the image in real time using the cumulative difference function calculated by the cumulative difference function detection means when the input image stored in the image storage means is displayed.

13 Claims, 4 Drawing Sheets

U.S. PATENT DOCUMENTS

| | | | | |
|---|---|---|---|---|
| 6,219,447 B1 * | 4/2001 | Lee | | 382/168 |
| 6,259,472 B1 * | 7/2001 | Park | | 348/28 |
| 6,507,668 B1 * | 1/2003 | Park | | 382/169 |
| 6,611,296 B1 * | 8/2003 | Nieuwenhuizen et al. | | 348/625 |
| 6,700,628 B1 * | 3/2004 | Kim | | 348/687 |
| 6,704,725 B1 * | 3/2004 | Lee | | 707/4 |
| 6,792,141 B2 * | 9/2004 | Huniu | | 382/169 |
| 6,820,090 B2 * | 11/2004 | Chambers et al. | | 707/101 |
| 7,012,625 B1 * | 3/2006 | Kobayashi et al. | | 345/690 |
| 7,019,756 B2 * | 3/2006 | Park et al. | | 345/589 |
| 7,219,034 B2 * | 5/2007 | McGee et al. | | 702/180 |
| 7,321,699 B2 * | 1/2008 | Johnson et al. | | 382/254 |
| 2003/0007689 A1 * | 1/2003 | Huniu | | 382/169 |
| 2003/0182293 A1 * | 9/2003 | Chambers et al. | | 707/100 |
| 2003/0191732 A1 * | 10/2003 | Lee et al. | | 706/61 |
| 2004/0008903 A1 * | 1/2004 | Kim | | 382/274 |
| 2004/0091169 A1 * | 5/2004 | Park et al. | | 382/274 |
| 2004/0109091 A1 * | 6/2004 | Park et al. | | 348/673 |
| 2004/0109612 A1 * | 6/2004 | Park et al. | | 382/254 |
| 2004/0131273 A1 * | 7/2004 | Johnson et al. | | 382/254 |
| 2005/0013503 A1 * | 1/2005 | Park et al. | | 382/254 |
| 2007/0104387 A1 * | 5/2007 | Han et al. | | 382/271 |
| 2007/0165947 A1 * | 7/2007 | Paik | | 382/169 |
| 2007/0183660 A1 * | 8/2007 | Park et al. | | 382/168 |
| 2007/0229445 A1 * | 10/2007 | Park et al. | | 345/102 |

FOREIGN PATENT DOCUMENTS

| | | | |
|---|---|---|---|
| EP | 1498846 A2 | * | 1/2005 |
| JP | 2005039817 A | * | 2/2005 |

* cited by examiner

APPARATUS AND METHOD FOR CONTROLLING BRIGHTNESS OF MOVING IMAGE SIGNALS IN REAL TIME

BACKGROUND OF THE INVENTION

1. Field of the Invention

The present invention relates, in general, to an apparatus and method for controlling the brightness of moving image signals in real time and, more particularly, to an apparatus and method for controlling the real time brightness of moving image signals, which applies an image processing technique of equalizing images using a cumulative distribution function, obtained by accumulating histogram information extracted from images, to image quality improvement fields for a moving image display device in real time, thus automatically correcting in real time the brightness of output images depending on the brightness of moving images that are input in real time, and outputting the corrected output images.

2. Description of the Related Art

Generally, a histogram equalization technique, which is a method of automatically adjusting the brightness of an image, is an image processing technique for converting a very dark image into a bright image and maximizing the contrast of an input image. This technique allows an image, which is difficult for a human to see, to be easily seen by improving the contrast of the image, so that the technique has been successfully applied to various fields.

Figure 1:
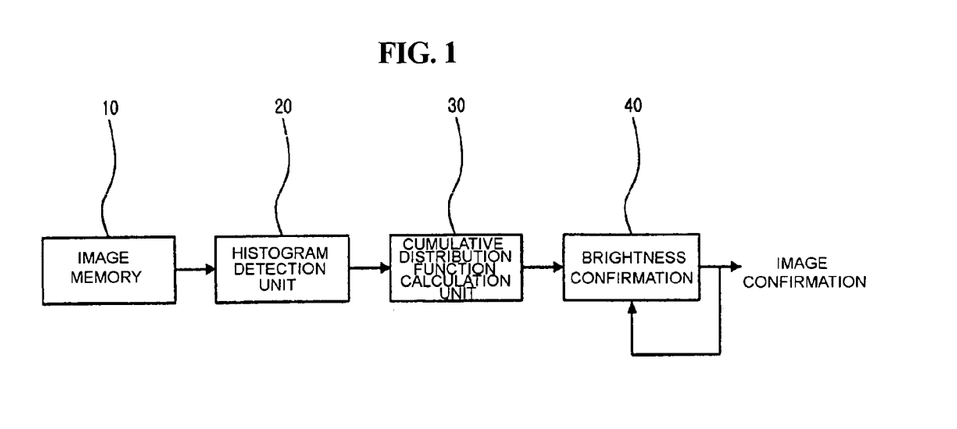
FIG. 1 is a block diagram schematically showing a conventional apparatus for controlling the brightness of still images signals.

However, in order to perform histogram equalization, as shown in FIG. 1, a histogram detection unit 20 reads image data stored in an image memory 10, and then calculates first the histogram distribution of an entire image. A cumulative distribution function calculation unit 30 accumulates the histogram distribution to obtain a cumulative distribution function. Thereafter, the cumulative distribution function is normalized to obtain a normalized cumulative distribution function suitable for mapping. The normalized cumulative distribution function is constructed in the form of a lookup table, so that a histogram-equalized image is obtained as an output signal if the cumulative distribution function is applied to an input image. As described above, the histogram equalization process is executed through a complicated algorithm. In most image processing, such a histogram equalization process has been executed in a software manner. Further, even though the histogram equalization is implemented using hardware, only a histogram generation part, which is the first processing step, is implemented using hardware, and the remaining data processing parts are implemented using software.

In this way, the histogram equalization process for still images can be implemented using software processing through the above-described technique, but 60 frames per second must be processed so as to apply the histogram equalization technique to moving images. Therefore, for such high-speed data processing, an entire algorithm needs to be implemented using hardware. However, there are several difficulties in implementing the above-described algorithm using hardware. That is, the histogram information of image data, which are input at very high speeds, must be calculated with respect to each frame, and cumulative distribution function data must be stored and used at the time of displaying images. At this time, in order to store a cumulative distribution function corresponding to one frame, at least 256-byte or greater histogram information should be stored in real time even though the stored histogram information differs with the number of image data bits and the size of screens. Further, according to the characteristics of moving image information, cumulative distribution functions can be normally calculated in the image input stage and applied in the display stage. Therefore at least three sets of cumulative distribution functions are stored. Accordingly, since a very large storage space is required to store cumulative distribution functions, and the cumulative distribution functions should be stored in registers, not a memory, there are many difficulties in actually implementing the histogram equalization algorithm using hardware.

SUMMARY OF THE INVENTION

Accordingly, the present invention has been made keeping in mind the above problems occurring in the prior art, and an object of the present invention is to provide an apparatus and method for controlling the brightness of moving image signals, which calculates the cumulative distribution function of an input image with respect to only a part of gray level components using a part of upper bits of input image data, not all gray level components of the input image, at the time of calculating the cumulative distribution functions and introduces the concept of cumulative difference functions, so as to implement a histogram equalization process for moving images using hardware, thus greatly reducing the amount of data required to store the cumulative distribution functions.

In order to accomplish the above object, the present invention provides an apparatus for controlling the brightness of moving image signals, which automatically adjusts brightness of output images in real time depending on the brightness of input moving images and outputs the brightness-adjusted output images, comprising cumulative difference function detection means calculating a cumulative difference function using upper n bits of each input image; image storage means storing therein the input image; and brightness adjustment means adjusting brightness of the image in real time using the cumulative difference function calculated by the cumulative difference function detection means when the input image stored in the image storage means is displayed.

Further, the present invention provides a method of controlling the brightness of moving image signals, which automatically adjusts brightness of output images in real time depending on brightness of input moving images and outputs the brightness-adjusted output images, comprising calculating a cumulative difference function using upper n bits of each input image; storing therein the input image; and extracting the stored image and adjusting brightness of the image in real time using the calculated cumulative difference function.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Hereinafter, embodiments of the present invention will be described in detail with reference to the attached drawings.

Figure 2:
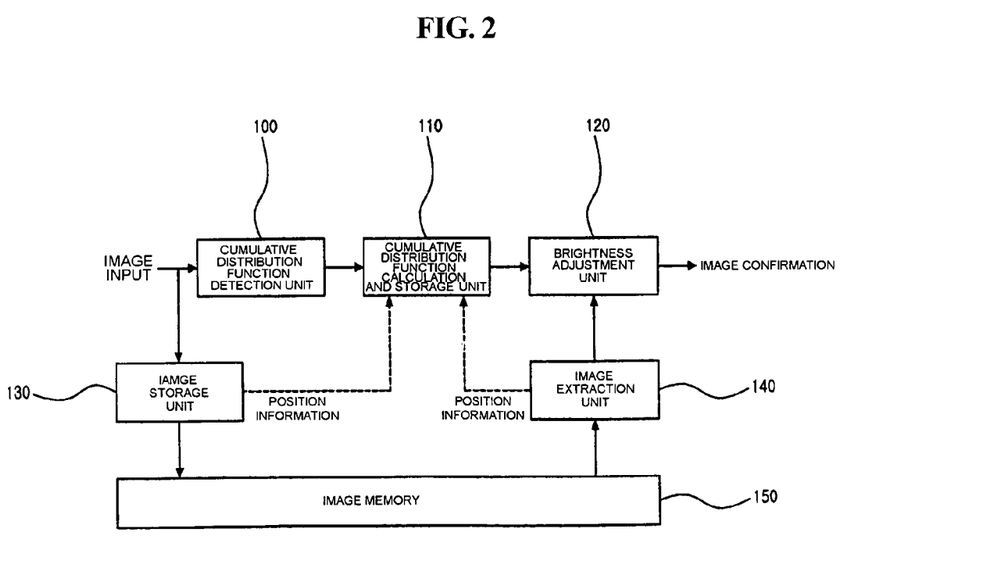
FIG. 2 is a block diagram showing an apparatus for controlling the brightness of moving image signals in real time according to the present invention.
Figure 3:
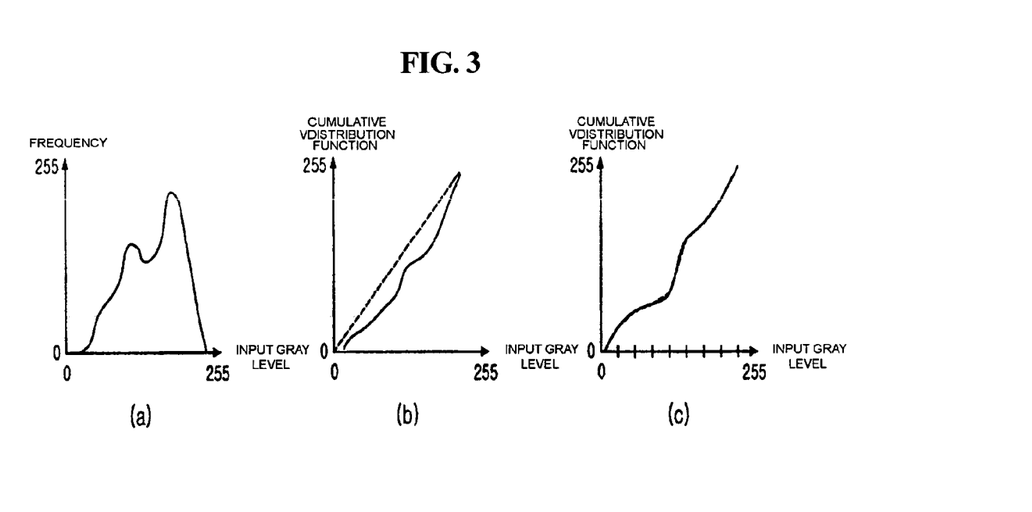
FIGS. 3a to 3c are views showing examples of typical shapes of the histogram and cumulative distribution function obtained from images.

FIG. 2 is a block diagram of an apparatus for controlling the brightness according to the present invention, which calculates and stores a cumulative difference function for each frame with respect to moving images that are input in real time, and automatically controls the brightness of images using the values of the cumulative difference function when the images are displayed. A cumulative distribution function detection unit 100 is a device that examines the gray level of each pixel of an input image to obtain a histogram and calculates a cumulative distribution function using the histogram. The histogram of the input image represents the relative frequencies of gray levels of each image, as shown in FIG. 3a. If the frequencies are sequentially accumulated from 0, the cumulative distribution function shown in FIG. 3b can be obtained. That is, as shown in the following Equation [1] representing a normalized histogram function, if the number of pixels having a gray level k in an image forming a single frame is n(k), the histogram of FIG. 3a is obtained by normalization using the maximum value $n_{max}$ of the number of the pixels n(k) and a maximum gray level. For example, in case of an 8-bit image, the total number of gray levels L is $2^8=256$, and a minimum gray level is 0 and a maximum gray level is 255. Therefore, as shown in the following Equation [1], a histogram h(k) obtained in this case is a function having a maximum value 255 and a gray level k.

$$h(k) = \frac{n(k)}{n_{max}} \times (L-1), \quad k = 0, 1, 2, \ldots, L-1 \quad [1]$$

In the meantime, the cumulative distribution function of FIG. 3b is obtained by summing up the numbers of pixels having gray levels lower than k in the normalized histogram obtained above, as shown in the following Equation [2] representing a normalized cumulative distribution function. In this case, an image processing unit can be easily constructed later by performing normalization using the number of horizontal pixels M of the image, the number of vertical pixels N of the image, and the maximum gray level L-1. Therefore, in case of an 8-bit image similar to the above example, the total number of gray level components L is $2^8=256$, so that the following cumulative distribution function cdf(k) would always be 255 at the maximum gray level 255 because a denominator MN is equal to the total number of pixels of the image, and equal to the number of pixels accumulated at k=255:

$$cdf(k) = \frac{L-1}{MN} \sum_{i=0}^{k} n(i) \quad [2]$$

According to the prior art, in case of an 8-bit image, since the maximum value of the cumulative distribution function is 255, at least 1-byte information is required to express the magnitude of the cumulative distribution function of each gray level k. Further, since the total number of gray level components is 256, at least 256-byte storage space is required to construct the cumulative distribution function. In case of a moving image, since several frames must be temporarily stored in a memory to display the moving image, a plurality of sets of 256-byte cumulative distribution function data should be stored in consideration of the requirement of the frames. In case of 16-bit image data, since 2-byte information is required to express the magnitude of the cumulative distribution function of each gray level k, and the total number of gray level components is 65536, a storage space required to construct a cumulative distribution function increases geometrically with the increasing resolution of images.

Therefore, in order to implement the cumulative distribution function detection unit 100 using hardware, required hardware needs to be reduced by storing the cumulative distribution function at only a few approximation points. In accordance with such a need, the present invention linearly approximates a cumulative distribution function curve by, for example, 4, 8 or 16 regions, according to embodiments. That is, in case of an 8-bit image, the present invention stores the magnitude of the cumulative distribution function by classifying gray levels using only upper 3 bits of 8 bits, without storing the magnitude of the cumulative distribution function with respect to all of 256 gray level components. In this case, a gray level component having a bit value 0110001 and a gray level component having a bit value 01101111 are considered as the same gray levels. For example, if the magnitude of the cumulative distribution function for 8 gray levels, that is, 0, 32, 64, 96, 128, 160, 192 and 224, of a total of 256 gray level components ranging from 0 to 255 is calculated, the cumulative distribution function can be constructed using only 8 bytes, not 256 bytes. Even in this case, as shown in FIG. 3c, there is little difference between the entire shapes of an original cumulative distribution function indicated by a solid line and an approximated cumulative distribution function indicated by a dotted line, thus correcting brightness without deviating considerably from a normal case at the time of later histogram equalization. In this case, a required storage space can be remarkably reduced by several tens of times or more.

Figure 4:
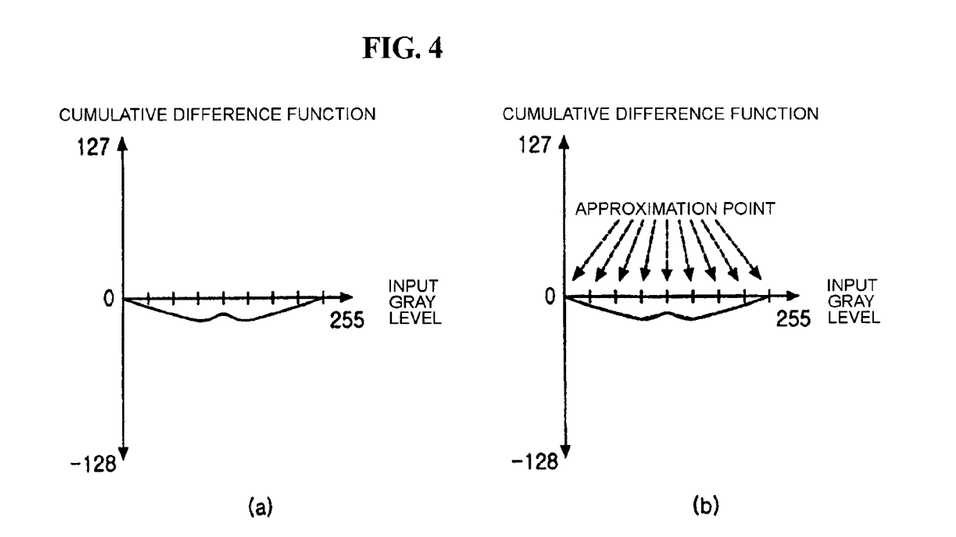
FIGS. 4a and 4b are views showing examples of a cumulative difference function and a process of approximating the cumulative difference function according to the present invention.

Now, a cumulative difference function, which is another feature of the present invention introduced herein, is described in detail. A cumulative difference function calculation and storage unit 110 of FIG. 2 functions to further compress data provided from the cumulative distribution function detection unit 100 and store the compressed data in registers. Image data must be stored in an image memory 150 through other processing stages, but the cumulative distribution function is stored in register regions, not the image memory, so that hardware can be simplified. In this case, a required storage space can be further reduced by storing a cumulative difference function (cdif) rather than the cumulative distribution function. The cumulative difference function is obtained by calculating a difference value between a reference function having a form of y=x indicated by a dotted line and the cumulative distribution function indicated by a solid line in FIG. 3b, which is shown in FIG. 4a. A precise equation to calculate the cumulative difference function can be expressed by the following Equation [3]. As shown in the following Equation [3], in case of 8-bit image data, the second term of a right side is always 255 at gray level k=255, so that the cumulative difference function cdif(k) is always 0.

$$cdif(k) = k - \frac{L-1}{MN} \sum_{i=0}^{k} n(i) \qquad [3]$$

As described above, in case of 8-bit image data, since the maximum value of the cumulative distribution function is always 255, 8-bit information is required to express the magnitude of the cumulative distribution function of each gray level. However, as shown in FIGS. 4a to 4b, in case of the cumulative difference function, since the maximum value thereof greatly decreases compared to that of the cumulative distribution function, the number of information bits required can be greatly reduced by utilizing the cumulative difference function. If various types of images are taken into consideration, most cumulative difference functions can be expressed even though only about 6-bit information is used, so that more storage space can be reduced.

If the above-described approximation method is applied to the cumulative difference function, a required storage space can be further reduced. FIG. 4b is a view showing an example of final approximation results of the cumulative difference function using upper 3 bits of 8-bit image information. In FIG. 4b, a curve indicated by a solid line is an original cumulative difference function and a curve indicated by a dotted line is a cumulative difference function using the approximation method. In this way, if only upper 3 bits are used, the cumulative difference function is expressed using a total of 9 approximation points obtained by adding the last gray level 255 to 8 gray levels 0, 32, 64, 96, 128, 160, 192 and 224, as described above. That is, if upper n bits are used, a cumulative difference function is expressed using $2^n+1$ approximation points. Although the approximation is carried out in this way, an error occurring due to the approximation is not too significant in most cases as shown in FIG. 4b, and does not cause serious image quality degradation. However, there is a slight difference in an equalization process, which does not cause any visual distortion.

Figure 5:
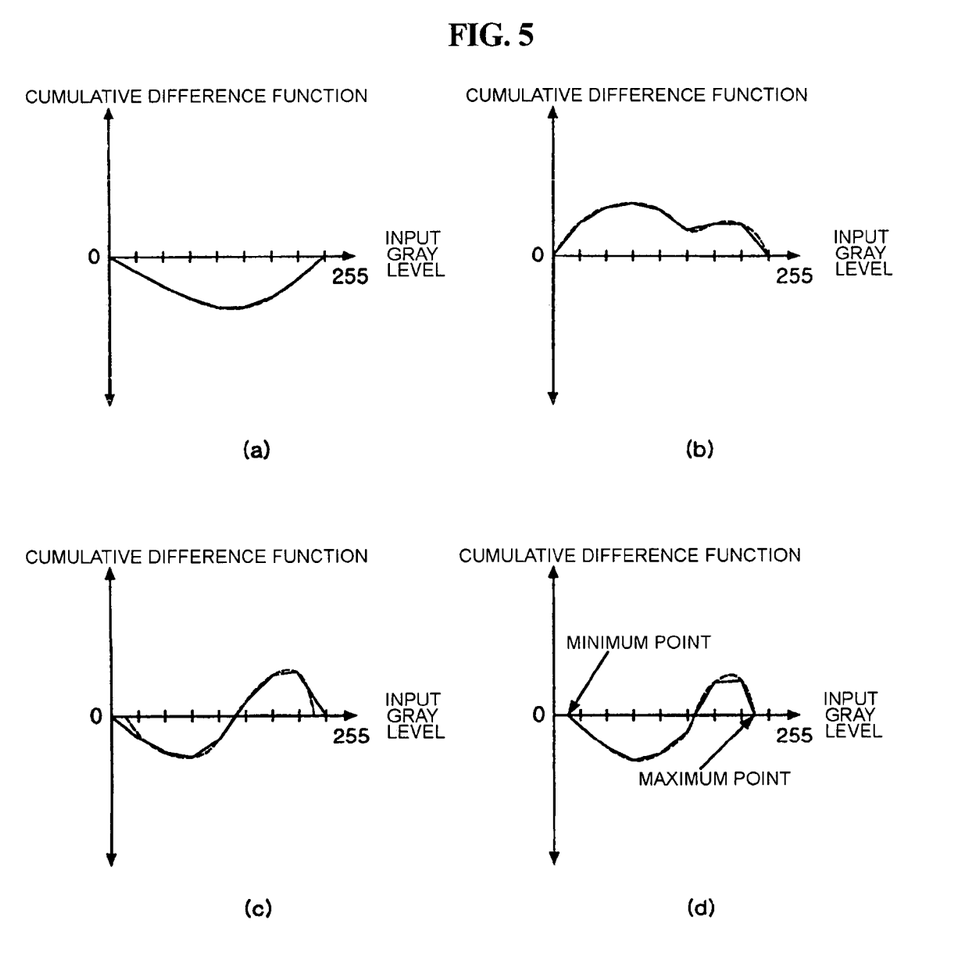
FIGS. 5a to 5d are views showing examples of approximation using approximation points for various types of cumulative difference functions.

FIGS. 5a to 5d illustrate various types of cumulative difference functions and forms obtained by approximating the cumulative difference functions using 9 approximation points. It can be seen that approximation can be carried out without causing a significant error with respect to various types. However, as shown in FIG. 5c, it can be seen that, if no image data exists near a gray level 0 or 255, an approximation error occurring near the gray level 0 or 255 is great. In this case, the minimum and maximum values of gray levels actually existing in an image are extracted instead of utilizing a gray level 0 or 255 (or 256) at the time of approximation, so that the approximation is performed through a method as shown in FIG. 5d, thus realizing a more precise approximation. In this case, the numbers of approximation points used are equally 9, but only information on minimum and maximum values of the gray levels actually existing in the image needs to be additionally stored.

In FIG. 2, an image storage unit 130 functions to execute several processing operations required for an input image, such as by filtering the input image to eliminate any rapid variations of the image, and to store the process results in the image memory 150. At this time, the image storage unit 130 is operated in synchronization with the cumulative difference function calculation and storage unit 110 to provide the number of images stored in the image memory 150 and the position information of the images to the cumulative difference function calculation and storage unit 110, thus enabling cumulative difference functions, the number of which is equal to the number of images stored, to be stored in a separate space.

An image extraction unit 140 functions to provide the position information of a currently read image to the cumulative difference function calculation and storage unit 110 so as to apply the cumulative difference function, calculated at the time of storing the image in the image memory 150, to the display of the image, at the same time that the image extraction unit 140 reads the image stored in the image memory 150 and provides it to a brightness adjustment unit 120.

The cumulative difference function calculation and storage unit 110 provides the cumulative difference function, calculated at the time of storing the image in the image memory 150, to the brightness adjustment unit 120 when the corresponding image is displayed, thus performing sufficient brightness adjustment. In a specific case, an input image may be immediately displayed without being stored in the image memory 150. In this case, a cumulative difference function in which one frame is delayed is inevitably applied. The one frame delayed-cumulative difference function is not the best solution, but there is no problem in the application thereof when a current case is not the case of a scene change. Accordingly, the one frame delayed-cumulative difference function can be selectively applied at need.

Figure 6:
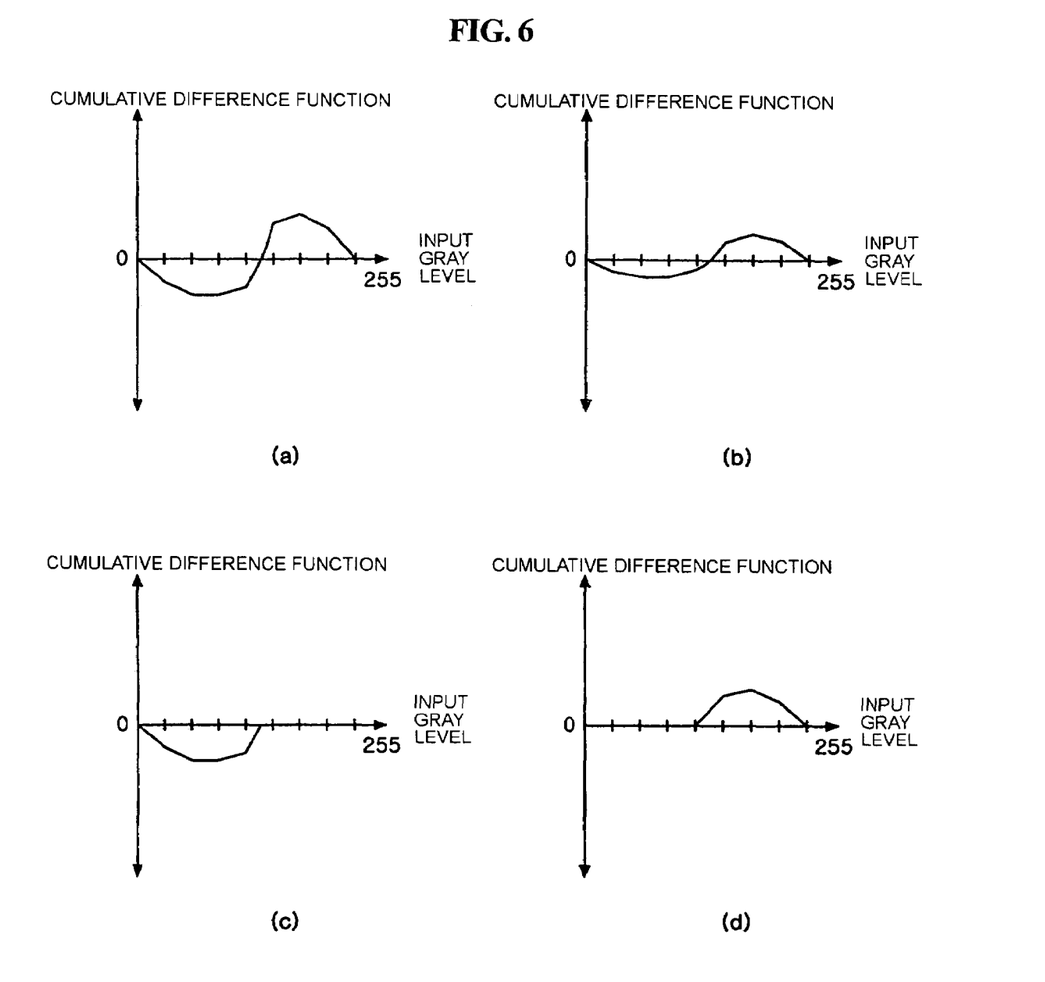
FIGS. 6a to 6d are views showing gain adjustment functions according to regions using cumulative difference functions.

The brightness adjustment unit 120 calculates a cumulative distribution function using a cumulative difference function value provided from the cumulative difference function calculation and storage unit 110, adjusts the brightness of an input image using the cumulative distribution function, and outputs the brightness-adjusted Image. In this case, as shown in FIGS. 6a to 6d, it is possible to variously adjust the brightness variations of the image by modifying the cumulative difference function value. That is, as shown in FIGS. 6a to 6d, when an original cumulative difference function provided from the cumulative difference function calculation and storage unit 110 has a form of FIG. 6a, various modifications can be applied to the cumulative difference function, as shown in FIGS. 6b to 6d. FIG. 6b illustrates a case where a suitable gain is multiplied by the cumulative difference function to adjust the brightness level of the image. Further, if necessary, histogram equalization can be performed with respect to only dark or bright portions of the image. In this case, the cumulative difference function is modified to the forms shown in FIGS. 6c and 6d, so that a cumulative distribution function is calculated. FIG. 6c illustrates a case where histogram equalization is performed for only a dark portion, and FIG. 6d illustrates a case where histogram equalization is performed for only a bright portion. In this way, the cumulative difference function is utilized to easily implement such modifications.

As described above, the present invention provides an apparatus and method for controlling the brightness of moving image signals, which introduces the concept of a cumulative difference function, and express the cumulative difference function by linearly approximating the cumulative difference function using a plurality of approximation points, thus greatly reducing a storage space required to perform histogram equalization for images. Therefore, a histogram equalization apparatus for moving images can be implemented using only a small amount of hardware.

Further, the present invention is advantageous in that it adjusts the coefficient values of the calculated cumulative difference function at need so that the cumulative difference function is suitably modified, thus implementing a function of adjusting various brightnesses to easily correspond to the characteristics of display devices or the preferences of viewers.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for controlling the brightness of moving image signals, which automatically adjusts brightness of output images in real time depending on brightness of input moving images and outputs the brightness-adjusted output images, comprising:

cumulative difference function detection means calculating a cumulative difference function using upper n bits of each input image;

image storage means storing therein the input image;

brightness adjustment means adjusting brightness of the image in real time using the cumulative difference function calculated by the cumulative difference function detection means when the input image stored in the image storage means is displayed; and wherein the cumulative difference function detection means comprises:

cumulative distribution function detection means obtaining a histogram of the input image and then calculating a cumulative distribution function for the input image on the basis of the histogram; and cumulative difference function calculation and storage means calculating the cumulative difference function using a difference between the cumulative distribution function and a reference function and storing the cumulative difference function.

2. The real time brightness control apparatus according to claim 1, wherein the cumulative difference function calculation and storage means linearly approximates the cumulative difference function by dividing the input image into $2^n+1$ approximation points using upper n bits of the input image, thus calculating an approximated cumulative difference function.

3. The real time brightness control apparatus according to claim 2, wherein the cumulative difference function calculation and storage means performs the linear approximation for the cumulative difference function by extracting minimum and maximum values of gray levels actually existing in the input image when no image data exists near a gray level 0 or maximum gray level.

4. The real time brightness control apparatus according to claim 1, wherein the cumulative difference function calculation and storage means calculates a normalized cumulative difference function using the number of pixels having a gray level i, a maximum gray level L-1, the number of horizontal pixels M, and the number of vertical pixels N by the following Equation:

$$cdif(k) = k - \frac{L-1}{MN}\sum_{i=0}^{k} n(i),$$

where k=0, 1, 2, ..., L-1.

5. The real time brightness control apparatus according to claim 1, wherein the image storage means comprises:

an image storage unit executing image processing for the input image and transmitting image-processed results to an image memory, and providing the number of images that are transmitted to the image memory and position information of the images to the cumulative difference function calculation and storage means in synchronization with the cumulative difference function calculation and storage means;

the image memory storing therein the input image processed by the image storage unit; and an image extraction unit reading the image stored in the image memory and providing the image to the brightness adjustment means, and providing position information of a currently read image to the cumulative difference function calculation and storage means.

6. The real time brightness control apparatus according to claim 1, wherein the brightness adjustment means constructs the cumulative distribution function on the basis of the cumulative difference function calculated by the cumulative difference function calculation and storage means, adjusts the brightness of the input image using the cumulative distribution function, and outputs the brightness-adjusted input image.

7. The real time brightness control apparatus according to claim 6, wherein the brightness adjustment means constructs the cumulative distribution function by utilizing the cumulative difference function without change or by modifying the cumulative difference function to correspond to characteristics of display devices or preferences of viewers, thus adjusting the brightness of the image.

8. A method of controlling real time brightness of moving image signals, which automatically adjusts brightness of output images in real time depending on brightness of input moving images and outputs the brightness-adjusted output images, comprising:

calculating a cumulative difference function using upper n bits of each input image;

storing therein the input image;

extracting the stored image and adjusting brightness of the image in teal time using the calculated cumulative difference function; and wherein the calculating of the cumulative difference function comprises:

obtaining a histogram of the input image and then calculating a cumulative distribution function for the input image on the basis of the histogram; and calculating the cumulative difference function using a difference between the cumulative distribution function and a reference function, and storing the cumulative difference function.

9. The real time brightness control method according to claim 8, wherein the cumulative difference function is linearly approximated and calculated by dividing the input image into $2^n+1$ approximation points using the upper n bits of the input image.

10. The real time brightness control method according to claim 9, wherein the linear approximation for the cumulative difference function is performed by extracting minimum and, maximum values of gray levels actually existing in the input image when no image data exists near a gray level 0 or maximum gray level.

11. The real time brightness control method according to claim 8, wherein the cumulative difference function is normalized and calculated using the number of pixels having a gray level i, a maximum gray level L-1, the number of horizontal pixels M, and the number of vertical pixels N by the following Equation:

$$cdif(k) = k - \frac{L-1}{MN}\sum_{i=0}^{k}n(i),$$

where k=0, 1, 2, . . . , L-1.

12. The real time brightness control method according to claim 8, wherein the adjusting of brightness is performed so that the cumulative distribution function is constructed on the basis of the calculated cumulative difference function, the brightness of the input image is adjusted using the cumulative distribution function, and the brightness-adjusted input image is output.

13. The real time brightness control method according to claim 12, wherein the adjusting of brightness is performed so that the cumulative distribution function is constructed by utilizing the cumulative difference function without change or by modifying the cumulative difference function to correspond to characteristics of display devices or preferences of viewers, thus adjusting the brightness of the image.

* * * * *